June 15, 1926.

R. E. SCHLEY 1,588,996

FLUID POWER TRANSMISSION

Filed June 6, 1921

INVENTOR.
Rudolph Edward Schley
BY
Erwin Wheeler & Woolary
ATTORNEYS.

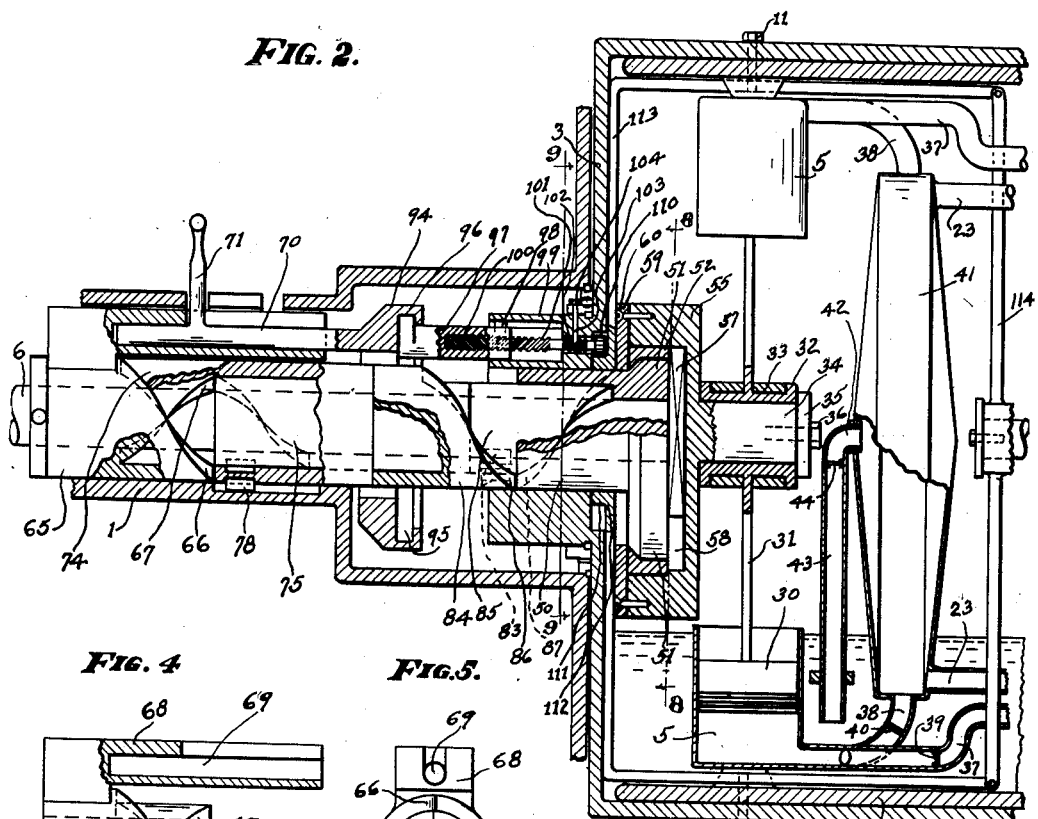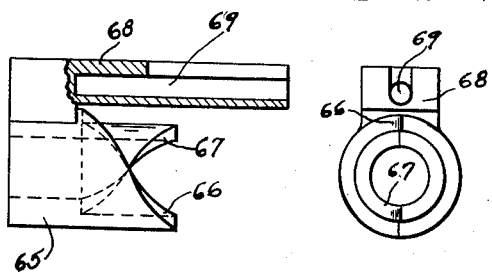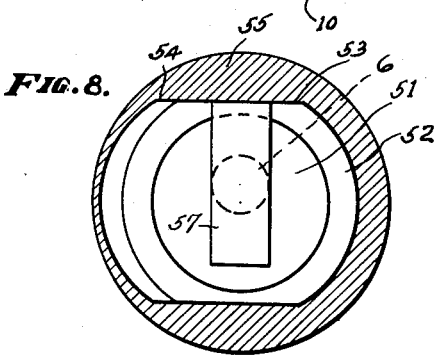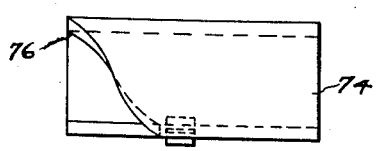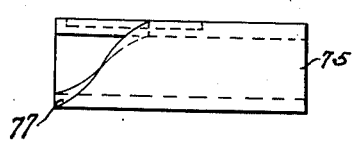

June 15, 1926.

R. E. SCHLEY 1,588,996

FLUID POWER TRANSMISSION

Filed June 6, 1921

INVENTOR.
Rudolph Edward Schley
BY
Erwin Wheeler & Woolard
ATTORNEYS.

Patented June 15, 1926.

1,588,996

UNITED STATES PATENT OFFICE.

RUDOLPH EDWARD SCHLEY, OF BEAVER DAM, WISCONSIN.

FLUID-POWER TRANSMISSION.

Application filed June 6, 1921. Serial No. 475,272.

This invention relates to improvements in fluid power transmission.

It is one of the principal objects of this invention to provide a new type of hydraulic transmission wherein the devices for transmitting power at low speeds are disposed within a rotatable casing axially aligned with driving and driven shafts, said low speed devices being adapted to lock themselves automatically when driving and driven shafts reach the same speed and rotate with the casing in direct drive.

It is a further object of this invention to provide a device of this character with the operating parts mounted within a closed casing which is adapted to rotate under certain conditions; and with means for controlling the operation of the parts within the casing whether the casing be rotating or stationary.

Another object of this invention is to provide a hydraulic pump in which the throw of the pistons is variable. More specifically, this invention includes means carried by the power shaft whereby the radius of the circle described by the crank arm can be varied at will by the operator while the power shaft is in motion.

Other objects of this invention are to provide improved controlling mechanism for varying the speed and direction of rotation of the driven shaft, to provide a construction which may be easily and quickly disassembled, to provide a mechanism wherein the operating parts are fully enclosed in a receptacle suitable for use as a reservoir, and to provide a new and improved form of eccentric mechanism peculiarly adapted to vary the radial displacement of a crank pin.

In the drawings:

Fig. 2 is a fragmental section taken on line 2—2 of Fig. 1 showing the pump and the means for varying the stroke of the pump pistons, parts being broken away to expose details of the operating mechanism.

Fig. 4 is a detail view of a reciprocatory member which is operable to effect a change in the position of the crank pin.

Fig. 5 is an end view of the same member.

Fig. 6 is a detail view of one of the sleeves with which the member shown in Figs. 4 and 5 is adapted to interact.

Fig. 7 is a detail view of another sleeve with which the same member is adapted to interact.

Fig. 8 is a section taken on line 8—8 of Fig. 2 showing in detail a novel form of eccentric by means of which the throw of the pump crank is varied.

Like parts are identified by the same reference characters throughout the several views.

Figure 1:
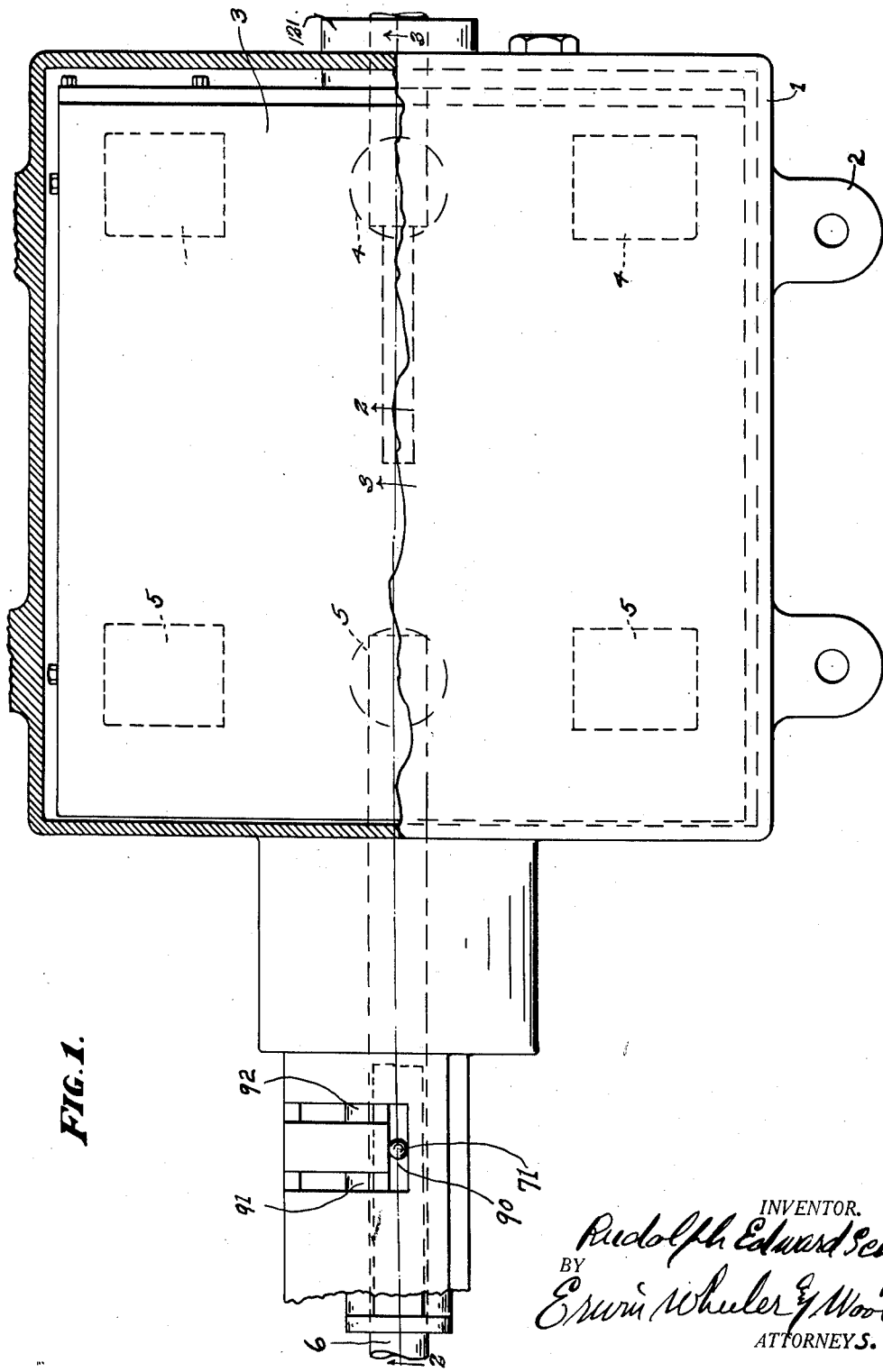
Fig. 1 is a plan view showing the exterior housing within which an embodiment of this invention may be located, parts of the housing being broken away to expose the rotative casing.

It will be understood that this improved form of hydraulic transmission is adapted for use in connection with any power transmission shaft where it is desired to vary the speed of a driven portion of the shaft relative to the speed of the driving portion and to effect a change in the mechanical advantage of the driving portion of the shaft over the driven portion of the shaft. For example, it is particularly adapted for use in connection with a motor vehicle or in connection with a power shaft of a lathe, or of any other machine in which changes of speed or mechanical advantage are desirable.

The pumping or power generating unit and the motor or power receiving unit may each be connected to their respective shafts by mechanism for reciprocating the pistons, one form of reciprocatory mechanism being embodied with drawings in the form of crank mechanism. In the pumping unit the reciprocatory mechanism is variable to provide a plurality of lengths of piston movements to vary the capacity of the pumping unit. A rotatable power transmitting unit is arranged to receive power from the pumping unit and delivering such power to the motor unit as will more specifically appear hereafter. The rotatable power transmitting unit is so constructed that when the capacity of the generating unit is less than the capacity of the receiving unit, the transmitting unit will be stationary and when the capacity of the generating unit is equal to the capacity of the receiving unit, the transmitting unit will rotate and the generating, receiving and transmitting units become as one unit in a direct drive relation of one to one of the generating unit to the receiving unit.

An exterior housing is shown at 1 provided with ears 2 which may be attached to a supporting frame such as the frame of a motor vehicle. The housing may be omitted if so desired and is merely provided for the purpose of enclosing all moving parts. The housing is broken away in Fig. 1 to expose a rotatively mounted casing 3 within which are located at one end the motor cylinders 4 and at the other end the pump cylinders 5. Preferably the pump and motor cylinders are approximately the same diameter. The power shaft 6 is led into one end of housing 1 and passes through the hub of the rotatable casing 3, within which it is operatively associated through an adjustable crank pin hereinafter to be described with suitable pistons movable in the pump cylinders 5. Other pistons in the motor cylinders 4 are connected with a crank upon the driven or transmission shaft 7.

For the purpose of promoting accessability, the inner casing 3 is preferably made in the form of a cylinder closed at one end by a disk 9. Integral with this disk, or made fast thereon, are four longitudinal arms 10 which are adapted to project in close proximity to the wall of the cylindrical casing member 3 to a point near the opposite end thereof. The cylinders 4 and 5 of the motor and pump respectively are made fast to the arms 10 and are further secured by bolts 11 which pass through the casing and the arms 10 into engagement with the cylinder head thereby binding together the several parts. When it is desired to disassemble the structure, the bolts 11 may be removed and bolts 12 which hold the disk 9 in place may be taken out: whereupon disk 9 may be pulled outwardly, drawing with it the entire assembly of pump, motor and related parts.

The motor comprises a series of cylinders 4, preferably four in number, supported within the casing 3 by arms 10 and bolts 11 in the manner heretofore described. Suitable pistons 13 and connecting rods 14 are associated with each cylinder. The connecting rods 14 are each connected to an arcuate member 15 subtending an angle of somewhat less than 90° where four connecting rods are used. It will be understood that the arcuate extent of these members will vary in accordance with the number that are used.

Figures 3, 9:
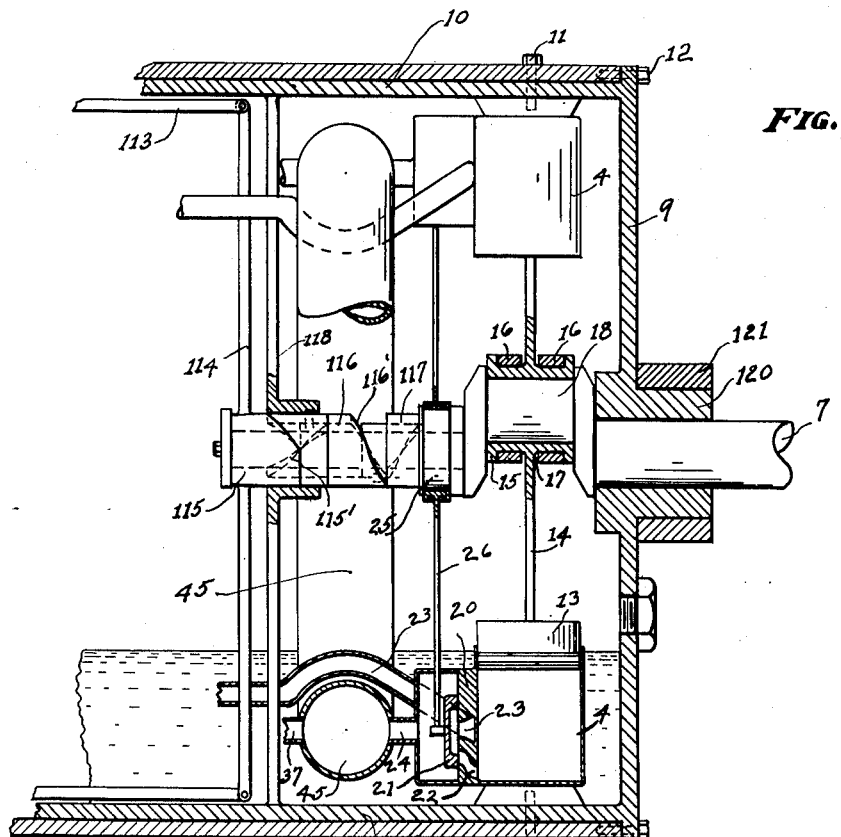
Fig. 3 is a section taken on line 3—3 of Fig. 1 showing the motor end of the casing, this section being in effect a continuation of the section shown in Fig. 2.
Fig. 9 is a section on line 9—9 of Fig. 2 showing in detail a special form of ball clutch controlling the rotative casing within which both the pump and the motor are located.

The binding rings 16 are made in two sections adapted to be bolted together in the channels 17 of members 15 to hold said members 15 in contact with the crank 18 of the driven shaft 7. Associated with each of the cylinders 4, is a slide valve mechanism 20 having a valve 21 which is adapted to connect the port 22 alternately with exhaust passage 23 and intake passage 24. In Fig. 3, the cylinder 4 is shown in communication through slide valve 21 and port 22 with the exhaust passage 23. The slide valve 21 is operated in any desired manner such as by the eccentric 25 and rod 26 as shown.

The pump cylinders 5 are mounted at the end of casing 3 opposite to the motor cylinders 4 and are supported by the arms 10 and bolts 11 as heretofore described. These pump cylinders are provided with pistons 30 and connecting rods 31 which fasten to arcuate bearing members 32 similar to the bearing members 15 previously described in the motor assembly. Retaining rings 33 bind the bearing members 32 to the variable throw crank 34. The disk 35 secured in place by a bolt 36 may be used if desired to lock bearing members 32 upon the crank. Such a disk is unnecessary, however, since if the parts are correctly machined, they will run true without any tendency to become separated. Each pump cylinder 5 is provided with a pair of ducts 37 and 38 valved at 39 and 40 respectively to permit the passage of fluid through duct 38, which is the intake passage, from the tank or storage chamber 41, which may be termed for the purposes of this specification, the low pressure chamber. This chamber may be provided with suitable means for supporting it from the arms 10. It is provided at its axis with a rotatable elbow 42 from which a weighted tube 43 hangs downwardly regardless of the position or rotative condition of casing 3. Casing 3 is adapted to serve as a storage chamber for the fluid which operates the device and the tube 43 is adapted to keep the interior of the low pressure chamber 41 in constant communication with the fluid shown at Fig. 2 stored in the chamber 3. Fluid taken in by a pump cylinder 5 from low pressure chamber 41 through the pipe 38 and valve 40 is expelled by the return stroke of the piston 30 through valve 39 and pipe 37 into the distributing manifold 45.

This manifold may comprise a circular tube or annulus in communication through the pipes 24 with slide valve mechanism 20. The annulus 45 constitutes a high pressure fluid chamber. The fluid delivered by pumps 5 under high pressure is distributed through chamber 45 to the several cylinders 4 of the motor within which it acts upon the pistons 13 to turn the driven shaft 7 and is delivered out of cylinders 4 through the exhaust pipe 23 into the low pressure chamber 41. The arrangement is such that if through leakage or other causes the supply of oil in the low pressure chamber becomes diminished, a fresh supply will be sucked in through the depending pipe 43 by the pistons 30.

As has been previously stated, the crank pin 34 has a variable throw. In Fig. 2 and Fig. 8 of the drawings, the crank pin is shown in its neutral position, i. e., the position in which it is axially aligned with the axis of the power shaft 6. The mechanism whereby the throw of the crank pin may be increased to a maximum will now be discussed.

Journaled upon the power shaft 6 is a rotatable sleeve 50 provided at its end with an eccentric head 51. Journaled upon the exterior surface of eccentric 51 is a sliding member 52 having two parallel outer surfaces 53 which are adapted to bear upon corresponding parallel surfaces 54 upon the inner side of a circular member 55. Member 55 carries the crank pin 34. Carried by the end of the power shaft 6 is a rectangular block 57 which is engaged in a slot or rectangular recess 58 in the member 55. It will be apparent from an inspection of Fig. 8 that rotation of eccentric 51 relatively to shaft 6 will cause bearing member 52 to reciprocate from side to side and member 55 to reciprocate up and down, reference being had to the particular position of these parts as they appear in Fig. 8. By reason of the engagement of the block 57 with member 55, it will be apparent that member 55 can have no independent rotative movement relative to shaft 6, but will be forced to rotate therewith regardless of the degree to which member 55 may be displaced by eccentric 51.

In the position in which it appears in Figs. 2 and 8, the eccentric 51 is so disposed relative to shaft 6 that member 55 and crank pin 34 which is carried thereby are at one extremity of their movement relative to the shaft 6. With the parts in the position shown, the crank pin is accurately aligned with shaft 6 and will be forced to rotate therewith by the squared block 57 in engagement with the slot 58. If eccentric 51 is rotated, however, relative to shaft 6, the sliding member 52 will absorb the component of the movement of the eccentric in one direction and the member 55 will absorb the component of the movement along a line at 90° to said direction so that the crank pin 34 will move radially outwardly from the position in which it is shown and will continue so to move until the eccentric 51 has been rotated 180° relative to shaft 6. In this position, the crank pin 34 is at full throw and the pistons 30 will accordingly reciprocate throughout the full length of cylinders 5. Preferably, the displacement of pistons 30 in cylinders 5 with the crank pin 34 at its maximum throw exceeds the displacement of pistons 13 in the motor cylinders 4.

It will be particularly noted that by reason of the eccentric movement shown and described, the movement of crank pin 34 relative to the end face of shaft 6 takes place upon a radial line. This desirable result is obtained by the rectangular guide block 57 moving in rectangular recess 58 in member 55 which restricts the movement of said member to radial lines and by the bearing member 52 which moves between the surfaces 54 at right angles to slot 53 thereby absorbing the right angle component of the movement of eccentric 51. A disk 59 may be secured by screws 60 to the rear face of member 55 to hold said member in operative position relative to the sliding member 52 and to eccentric 51.

Rotatively mounted upon the shaft 6 adjacent to the outer end of the housing 1 is a sleeve 65 having portions of its wall cut away as shown in Figs. 4 and 5 to form oppositely disposed cam surfaces or thread surfaces 66 and 67. The sleeve 65 is provided with an extension or arm 68 having a longitudinally disposed recess 69 within which a rod 70, bearing operating handle 71 is adapted to slide for purposes hereinafter to be described. Suitable bearings are provided for the rotatable sleeve 65 to take up the end thrust and prevent any axial movement of said sleeve along shaft 6. Mounted upon the shaft adjacent to the cam surfaces of sleeve 65 are a pair of concentric sleeves 74, 75. These sleeves are provided with cam surfaces 76 and 77 respectively which are adapted to bear upon surfaces 66 and 67 of the rotative sleeve 65. The housing 1 and sleeve 75 are each provided with a long keyway and the sleeve 74 is provided with sliding keys 78 adapted to slide in their corresponding keyways whereby their only movement must necessarily be longitudinal of shaft 6. The arrangement is such that when the sleeve 65 is rotated by means of handle 71 the bearing surfaces 67 and 66 will slide upon bearing surfaces 76 and 77 of sleeves 74 and 75 causing one sleeve to slide upon shaft 6 in the direction of casing 3 while the other sleeve is allowed to recede from the casing 3. An opposite rotation of the sleeve 65 will cause the sliding sleeves 74 and 75 to move in opposite directions. In Fig. 2 of the drawings, sleeve 74 is shown at the limit of its movement to the left while sleeve 75 is at the limit of its movement to the right.

The sliding sleeves 74 and 75 are each provided with an end surface in a plane normal to the axis of the sleeves. The end surfaces of sleeves 74 and 75 are adapted to have rotative bearing against the end surfaces of the similar sleeves 84 and 85 which are likewise slidable upon shaft 6 but are keyed thereto to rotate therewith by means of the keys shown at 83 in Fig. 2. The sliding sleeves 84 and 85 are provided with cam surfaces 86 and 87 respectively, said cam surfaces being in all respects similar to the cam surfaces of sleeves 74 and 75. The cam surfaces 86 and 87, of the sliding sleeves 84 and 85, interact with sleeve 50 in the same manner in which sleeves 74 and 75 interact with sleeve 65.

By means of the mechanism above described, it is possible to produce rotation of sleeve 50 and of eccentric 51 carried thereby, relative to the rotating shaft 6 within the casing 3. In Fig. 2, handle 71 is at the limit of its motion toward the observer. If it be moved away from the observer, sleeve 65 will be given a counter-clockwise rotation which will cause sliding sleeve 74 to move inwardly toward the pump. The end surface of this sleeve bearing upon the end surface of sleeve 84 which is rotating with shaft 6 will cause sleeve 84 to slide upon shaft 6 while rotating therewith and this sliding movement will in turn be communicated by means of cam surface 86 to the sleeve 50 causing this sleeve to rotate with eccentric 51 relative to shaft 6 thereby moving the crank pin 34 radially outwardly in the manner above described. It will be apparent that this rotation of the sleeve 50 will impel in the opposite direction the inner set of sleeves, including sleeve 85 and sleeve 75. The cam surface 77 upon sleeve 75 will be accommodated by cam surface 67 upon sleeve 65 as the latter rotates. Obviously, the rotation of handle 71 back to the position in which it appears in Fig. 2 will impel the sliding sleeves 75 and 85 inwardly towards the pump, causing sleeve 50 to rotate in an opposite direction relative to shaft 6, bringing the crank pin 34 back to axial alignment with said shaft, and returning the sliding outer sleeves 84 and 74 respectively to their initial position.

If reference is now had to Fig. 1, it will be noted that the handle 71 is operable in a C-shaped slot having a longitudinal portion 90 and two transverse arms 91 and 92 respectively. It will be apparent from the foregoing that the movement of handle 71 away from the longitudinal slot 90 to the end of either of the transverse slots 91 and 92 will have the effect of moving the crank pin 34 radially outward to increase its throw and that the movement of handle 71 back to its neutral position in slot 90 must result in the return of the crank pin 34 to its position of axial alignment with the shaft 6.

Handle 71, however, has an additional function accomplished by means of its longitudinal movement in the slot 90. The handle 71 is utilized to control a reversible one-way clutch for permitting rotation of the casing 3 in one direction and preventing rotation in the other direction. Such clutch comprises an annulus 106, balls 107, hub 99 upon the casing 3, and outer ring 109 upon the housing 1. It will be remembered that the handle is carried by a rod 70. At its inner end rod 70 is attached to a circular member 94 having an internal groove 95 within which a head 96 upon the plunger 97 is engaged. Plunger 97 is keyed at 98 to the hub 99 of casing 3. The plunger is provided with a threaded socket 100 with which the screw 101 is associated. At its inner end, the screw 101 carries threads of different pitch adapted to engage the worm wheel 102 which turns shaft 103 and pinion 104. This pinion engages teeth 105 in the outer face of the annulus 106 which serves as a spacer for the balls 107. A plurality of these balls may be provided. Each rests in a recess 108 in the hub of the casing 3. The concentric outer ring 109 is a part of the housing 1 and is therefore stationary. Obviously, the longitudinal reciprocation of handle 71 and rod 70 upon which the handle is mounted will impart a corresponding movement to plunger 97 and this in turn will cause the screw 101 to rotate, thereby moving the annulus 106 relative to casing member 3 upon which it is carried. The movement of annulus 106 will cause the balls 107 to approach one side or the other of recess 108 to lock casing 3 against rotation in either direction while permitting it to rotate freely in the other.

The screw 101 also carries upon its inner end a pinion 110 which meshes with teeth 111 upon a collar 112 within the interior of casing 3. This collar carries a plurality of arms 113 which follow the walls of the casing to a point at approximately the middle thereof where they are attached to a transverse bar 114 which is fast upon a sleeve 115. This sleeve is provided with cam surfaces and operates sliding sleeves similar to those already described with respect to the mechanism for causing the radial movement of crank pin 34, this mechanism being adapted to perform a similar function in moving eccentric 25 diametrically across the driven shaft 7 upon which it is mounted. It will be noted, however, that the arms 113 when rotated by pinion 110 are only capable of a rotative movement of something less than 90° between two adjacent pump cylinders 5. In order to utilize this rotative movement of less than 90° to create a movement of substantially 180° in the eccentric 25, the cam surfaces 115' are made with substantially twice the pitch of the cam surfaces 116' which are operatively associated to turn the member 117 to effect the translation of eccentric 25. The sliding sleeves 116 may be secured against rotation by suitable guides 118 projecting inwardly from the arms 10, sleeves 116 being keyed to these guides.

The portion 99 of casing 3 has heretofore been described as its hub. The casing is also provided at its opposite end with a hub 120 journaled within suitable bearings 121 mounted in the housing 1.

In use, the device herein described operates as follows:

With the control lever in any portion of the longitudinal slot 90, the crank pin 34 will be maintained in alignment with the rotating power shaft 6 and will, therefore, produce no movement in pistons 30. If the handle 71 be moved longitudinally to a position of registry with slot 91, eccentric 25 will be rotated to the position in which it appears in Figure 3, so that the slide valves 21 will operate in such a manner as to tend to cause the driven shaft 7 to rotate in the same direction with the driving shaft 6. It will be understood, however, that as long as the crank pin 34 is on center and the pistons 30 are not reciprocating, there will be no pressure upon pistons 13 to cause them to turn shaft 7. The handle 71 being now moved slowly into the transverse slot 91, the crank pin 34 will be caused to move, in the manner heretofore described, radially outward in such a way that the pistons 30 will begin to reciprocate with a gradually increasing stroke. The annulus 106, which carries balls 107, will have been moved to the right in Figure 9, relative to the casing 3, to hold said casing against rotation in a direction opposite to that of the power shaft 6.

The fluid pumped by pistons 30 in their gradually increasing reciprocation, will pass thru pipes 37 into the high pressure chamber 45 whence it will be admitted at the proper times by slides valves 21 into the cylinders 4. It will be apparent that by reason of the comparatively small throw of crank 34 at this time and the correspondingly small movement of pistons 30, the power shaft 6 will have a great mechanical advantage over the driven shaft 7. The reaction thru the cylinders 4, tending to drive casing 3 in a direction contrary to that of shaft 6, will be correspondingly greater at this time than the reaction upon cylinders 5 which tends to cause casing 3 to turn with shaft 6. This preponderance of reaction exerted thru the cylinders 4 is absorbed by the ball clutch. As the throw of crank pin 34 is increased by the movement of handle 71 toward the end of slot 91 and the movement of pistons 30 becomes greater and more nearly equal to the throw of crank 18 carried by shaft 7, the speed of shaft 7 will necessarily be increased by the increased delivery from cylinders 5 into the motor cylinders 4. Obviously, the mechanical advantage of shaft 6 over shaft 7 decreases accordingly and in like manner the preponderance of reaction thru cylinders 4 over the reaction thru cylinders 5 will decrease.

As has previously been stated, the disposition of the controlling mechanism is such that at the maximum displacement of handle 71 in slot 91, the throw of crank pin 34 will exceed slightly the throw of crank 18. Under these circumstances the mechanical advantage of shaft 6 over shaft 7 will entirely disappear and shaft 6 will tend to rotate at a very slightly less speed than shaft 7. The reaction thru the cylinders 5 will, therefore, become greater than the reaction thru cylinders 4 and the ball clutch will permit the casing 3 to rotate with shaft 6. Since shafts 6 and 7 are moved at approximately the same speed, the rotation of casing 3 will have an equal effect in reducing the relative reciprocation of pistons 30 and 13 in their respective cylinders. The delivery of the pump will be cut down in the same proportion as is the ability of the motor to use the fluid delivered thereto. Consequently, the preponderance of reaction thru pistons 5 will remain substantially constant and the casing 3 will attain the speed of shaft 6 and shaft 7 with the pistons subtantially stationary in both the pump and motor cylinders. The pistons will only move enough to keep the fluid under pressure and thereby furnish the necessary reaction. It will thus be apparent that I have succeeded in devising a hydraulic transmission in which the parts that operate to produce variable speed and mechanical advantage between the power shaft and the driven shaft come to rest automatically to produce a direct drive between said shafts, relieving the moving parts of the low speed mechanism of all wear.

When it is desired to stop shaft 7, the handle 71 will be moved back toward slot 90, gradually decreasing the throw of crank pin 34 and correspondingly decreasing the speed of reciprocation of pistons 13 and the rotative speed of shaft 7. When handle 71 is in slot 90, pistons 30 will be at rest and pistons 13 will be driven by the momentum of shaft 7 and the parts carried thereby. The fluid set in motion by pistons 13 under these conditions will pass into the reservoir 45 and will be drawn therefrom, thru valves 40 and 39 by the suction in cylinders 4. Thus if the fluid transmission be mounted upon a motor vehicle, brakes will be necessary to bring the vehicle and shaft 7 to rest before disposing the parts to produce the reversal of shaft 7.

If it be desired to produce a reverse rotation in shaft 7, the handle 71 is moved to a position of registry with slot 92, thereby shifting the ball clutch counter-clockwise relative to casing 3 to oppose the rotation of casing 3 in a clockwise direction. This movement of handle 71 will also cause the eccentric 25 to assume a position relative to shaft 7 one hundred eighty degrees from that in which it appears in Figure 3. The slide valve 21 will then be operative to cause shaft 7 to rotate in a counter-clockwise direction. It should be noted that the construction of the controlling mechanism is such that the slide valves cannot be operated to change the direction of rotation of shaft 7 without first bringing shaft 7 to a stop by moving handle 71 into slot 90.

When handle 71 has been moved into registry with slot 92, thereby arranging the clutch and the eccentric in the proper position for producing the reverse motion of shaft 7, the controlling handle may be pushed slowly into said slot 92 to displace crank pin 34 and cause the pistons 30 of the pump to begin to reciprocate. It will be apparent that with the crank pin 34 in full throw, the shaft 7 will have a speed equal to that of shaft 6 but in the opposite direction. There can, of course, be no drive through the casing during reverse. Casing 3 will not rotate since the reaction thru cylinders 4 and the reaction thru cylinders 5 now tend to turn casing 3 in the same direction and this tendency is resisted by the ball clutch.

I claim:—

1. A variable power transmission including a rotatable element, a driving shaft, a driven shaft, a power generating unit having a portion operable by the driving shaft and a portion carried by the rotatable element, a reversible power receiving unit having a portion connected with the driven shaft and a portion carried by said rotatable element, means for transmitting power from the generating unit to the receiving unit, a reversible clutch for alternatively holding said element against rotation in either direction while permitting rotation thereof in the other direction, and reversing means for simultaneously reversing said receiving unit and said clutch.

2. A variable power transmission including a rotatable element, a driving shaft, a driven shaft, a power generating unit having a portion operable by the driving shaft and a portion on said rotatable element, a power receiving unit having a portion connected with the driven shaft and a portion on said rotatable element, means for transmitting power from the generating unit to the receiving unit, reversing means for said receiving unit, and a reversible clutch for alternatively holding said element against rotation in either direction while permitting rotation thereof in the other direction.

3. The combination with a driving shaft and a driven shaft, of a rotatable casing enclosing the ends of said shaft, means for securing said casing alternatively against rotation in either direction, motor cylinders within said casing having pistons operatively connected with the driven shaft, pump cylinders within said casing having reciprocatory pistons operatively associated with the driving shaft, means for distributing the output of the pump cylinders to the motor cylinders to produce rotation in the driven shaft, means for varying the stroke of the pistons in the pump cylinders and means for reversing the motor.

4. The combination with a slotted housing, a driving shaft, a driven shaft, and a casing rotatable within said housing in axial alignment with said shafts, of motor mechanism within the casing and associated with the driven shaft, pump mechanism within the casing associated with the driving shaft, a handle carried by said housing and movable in a U-shaped slot therein, means whereby the movement of the handle into either arm of the slot will increase the output of the pump from zero to its maximum capacity, means whereby movement of the handle in the longitudinal portion of said slot will effect the reversal of the motor, and means whereby said last named movement of the handle will lock said casing against rotation in a direction opposite to that of the driven shaft while permitting it to rotate therewith.

5. The combination with a housing, a driving shaft, a driven shaft, and a casing rotatable within the housing in axial alignment with each of said shafts, of motor mechanism within the casing associated with the driven shaft, pump mechanism within the casing associated with the driving shaft, a handle upon said housing, means whereby said handle may be operated to vary the output of said pump mechanism, means whereby said handle may also be operated to reverse the motor, and a ball clutch shiftable by said last mentioned handle operation to secure the casing against rotation in the direction opposite to that of the driven shaft.

6. A hydraulic transmission including the combination with aligned driving and driven shafts, of a casing rotatable coaxially with said shafts, a pump and a motor in operative association within the casing and connected respectively with the driving and driven shafts, valve mechanism for controlling the admission of fluid to the motor, means for actuating said valve mechanism from the driven shaft, means for effecting from the exterior of the casing 180° of relative movement between the driven shaft and said valve actuating means, whereby the motor may be reversed, and means for alternatively locking the casing against rotation in either direction while permitting it to rotate freely in the other.

7. A transmission including an element rotatable in either direction, a pump and a motor mounted for rotation therewith and provided with interconnecting ducts, a driving shaft associated with the pump, a driven shaft associated with the motor, valve mechanism actuated from the driven shaft and associated with the motor for controlling the operation thereof, and means for securing said element alternatively against rotation in either direction while permitting it to rotate in the other, and means for reversing the motor.

8. A transmission including an element rotatable in either direction, a pump cylinder and a motor cylinder mounted for rotation therewith, pistons operative in said cylinders, a driving shaft associated with the piston in the pump cylinder, a driven shaft associated with the piston in the motor cylinder, ducts between said cylinders, valve mechanism controlling fluid flow through one of said ducts, means for actuating said valve mechanism from the driven shaft, means for securing said element alternatively against rotation in either direction, and means for reversing the motor cylinders.

9. A transmission including an element rotatable in either direction, a driving shaft and driven shaft associated therewith, a pump and motor mounted for rotation with said element and operatively associated respectively with the driving and driven shafts, means for varying the output of the pump from zero to an output greater than the capacity of the motor at like shaft speeds, and a ball clutch adapted automatically to lock said element alternatively against rotation in either direction.

10. A hydraulic transmission including a rotatable element, pump cylinders and motor cylinders mounted for rotation therewith and provided with interconnecting ducts including a distributing manifold, pistons reciprocable in said cylinders, driving and driven shafts associated respectively with the pistons of the pump and the motor, means interposed between the driving shaft and the pistons associated therewith for varying the reciprocatory travel of such pistons, valve mechanism interposed between said manifold and the motor cylinders and arranged for actuation from the driven shaft, an eccentric upon the driven shaft adapted to actuate the valve mechanism, means for rotating the eccentric a partial revolution with respect to the driven shaft regardless of the condition of rest or motion thereof, and means for securing said rotatable element against rotation alternatively in either direction while permitting it to rotate in the other.

11. A hydraulic transmission including a hydraulic pump, a hydraulic motor, an element supporting said pump and said motor and rotatable in either direction, means for varying the output of the pump whereby the mechanical advantage thereof over the motor may be varied from positive to negative, and means for securing said element alternatively against rotation in either direction when said mechanical advantage is positive and releasing said element when the advantage of the pump is negative.

12. A hydraulic transmission including a hydraulic pump, a hydraulic motor, a rotatable casing enclosing and supporting said pump and motor, a drive shaft and a driven shaft coaxial with said casing and associated respectively with pump and motor, means for varying the output of the pump and the mechanical advantage thereof from positive to negative with respect to the motor, means for reversing the motor, means for securing said casing against rotation alternatively in either direction while permitting free rotaton in another drection, and a single controlling means operatively controlling from the exterior of the casing the said variation of mechanical advantage, said means for reversing the motor, and said means for alternatively locking the casing against rotation.

13. In a variable speed transmission, the combination with a driving shaft, of a driven shaft, a rotatable casing, pump mechanism carried by the casing and having a variable throw connection with said driving shaft, a motor unit carried by the casing and having an unvariable throw connection with the driven shaft, said motor unit being adapted to receive the output of said pump and having reversing mechanism whereby to reverse the direction of rotation of the driven shaft, and a reversible one-way clutch adapted to alternatively prevent rotation of said casing in either direction and to permit rotation thereof in the other direction.

RUDOLPH EDWARD SCHLEY.